INVENTOR.
GEORGE B. DOREY

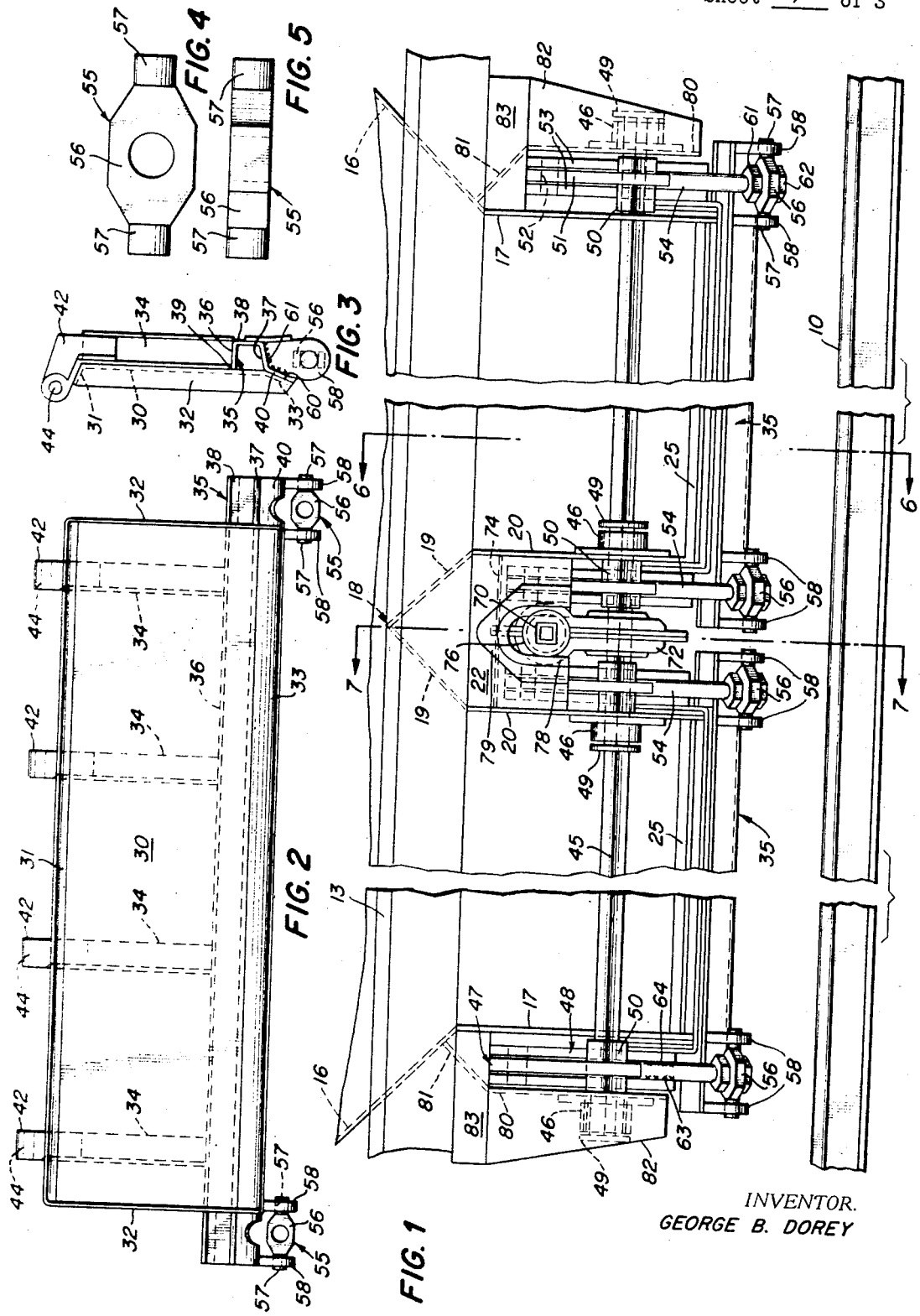

INVENTOR.
GEORGE B. DOREY

United States Patent Office 3,447,485
Patented June 3, 1969

3,447,485
HOPPER CAR DOOR ACTUATING MECHANISM
George B. Dorey, Westmount, Quebec, Canada, assignor to Continental Transport Appliances Limited, Montreal, Quebec, Canada, a corporation of Canada
Filed Jan. 9, 1967, Ser. No. 608,146
Int. Cl. B61d 7/02
U.S. Cl. 105—251                        4 Claims

ABSTRACT OF THE DISCLOSURE

An ore carrying hopper car having longitudinally mounted hopper doors which swing transversely of the car to cause lading to be discharged outwardly of the sides of the car. The doors are operated from either side of the car by means of operating heads and transversely arranged worm and gear assemblies which are floatingly carried by the shafts they operate. Abutments are provided to prevent radial movement of the assemblies.

The invention relates to a hopper ore car door mechanism for use in operating pivotally mounted doors such as employed for closing the bottom discharge openings of railway cars.

The invention more particularly relates to that type of ore car having oppositely swinging doors arranged for discharge of lading to the opposite outer sides of the car and wherein movement of the oppositely movable doors is conjointly effected by worm and gear mechanism operable from either side of the car.

It is an object of the invention to employ worm and gear assemblies floatingly carried by the shafts which they operate and incorporate abutments to function as stops for counteracting radial movement of the assemblies. It has heretofore been the accepted procedure to bolt or otherwise attach worm and gear housings to the car structure and depend on said assemblies to function as one of the load supporting members for the shaft and the improvement contemplates a reversal of the arrangement whereby the gear assemblies will be carried by the shaft and the weight of the doors and lading be transferred through the agency of bearing members separate from the gear assembly housings.

It has heretofore been the accepted practice in the hopper art to bolt or otherwise attach worm and gear housings directly to the car structure and to depend on the worm and gear assemblies to function as one of the load supporting members. The present improvement comprises a reversal of that arrangement in that the worm and gear assemblies are carried by the shaft and the weight of the doors and lading will be carried by bearing members independent of the gear assembly housings.

The new arrangement described, of a floating worm and gear structure, is especially advantageous in that it renders the shafts and mechanisms connected therewith self-adjusting to bending and twisting in the structure of the car incidental to buffing shocks, uneven roadbed, and curve track. Such distortions of the car structure put severe strains on the door operating mechanisms which can be avoided by the new arrangement.

For further comprehension of the invention reference may be had to accompanying drawings wherein:

FIGURE 1 is a vertical longitudinal side view of part of the lower portion of an ore car showing as much structure of the car as necessary to illustrate a pair of doors in closed position.

FIGURE 2 is a detached plan view of one of the doors.

FIGURE 3 is an end elevational view of the door shown in FIGURE 2 as viewed from right to left.

FIGURE 4 is a detached plan view of the swivel bearing element.

FIGURE 5 is a side elevational view of the swivel bearing element shown in FIGURE 4.

Figure 6:
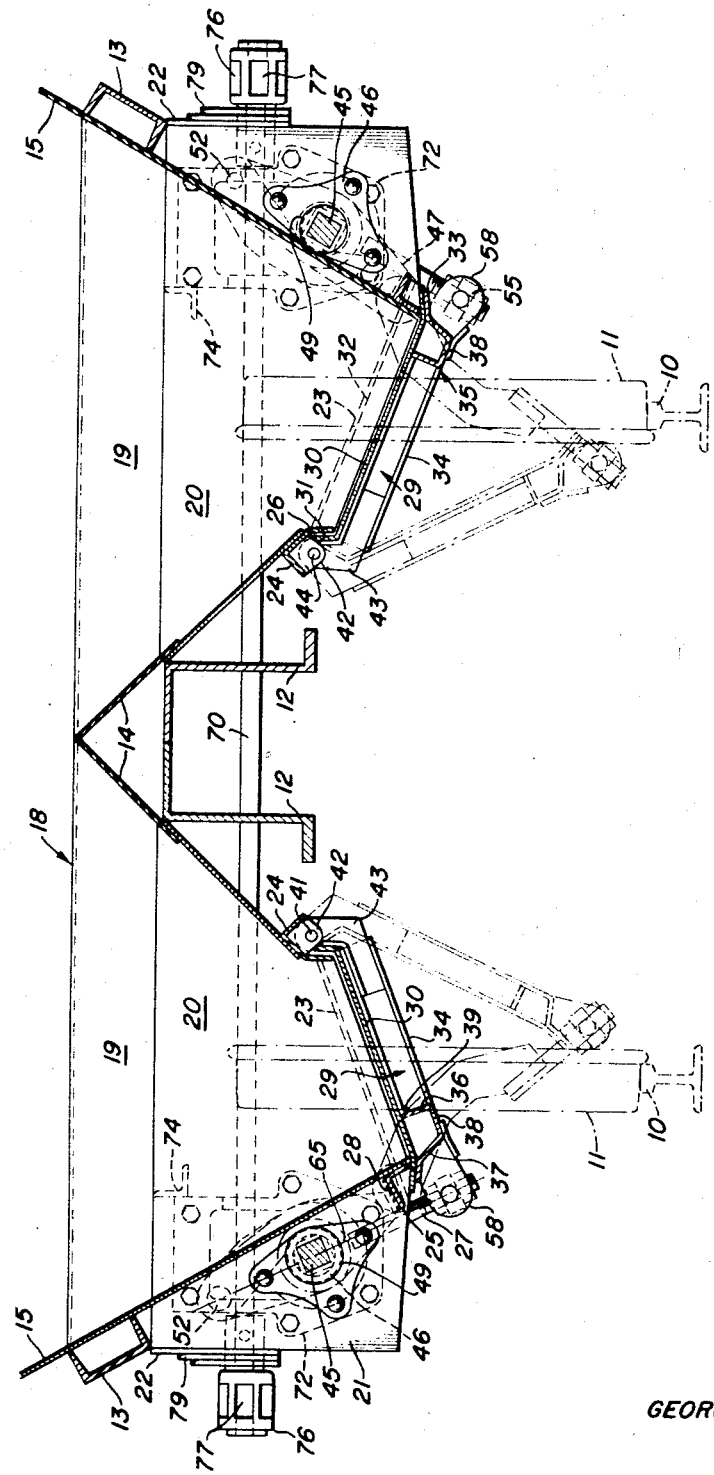
FIGURE 6 is a transverse vertical sectional view taken through the lower portion of the car and on a line 6—6 of FIGURE 1.
Figure 7:
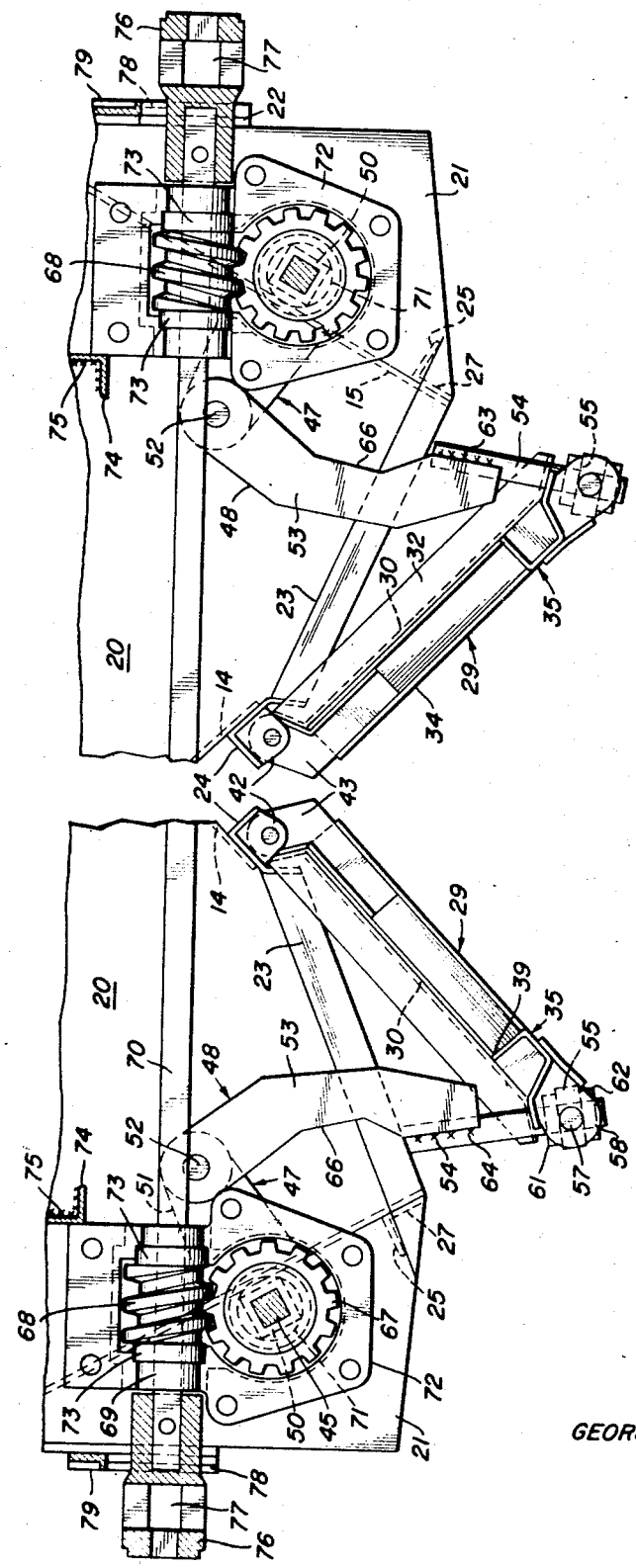
FIGURE 7 is a vertical transverse sectional view taken on a line 7—7 of FIGURE 1 and showing the parts positioned with the doors partly open.

Referring to the drawings 10 indicates the rails and 11 the wheels of the car and the car body structure is shown as including a center sill 12 and side sills 13—13. The car body includes inner and outer transversely sloping floors 14 and 15 respectively extending from the center sill 12 and side sills 13—13 in facing relation with their lower marginal edges spaced to provide a discharge area therebetween. End floors 16—16 slope longitudinally towards the discharge area and lead to vertically disposed wall sections 17. Midway between the end floors 16—16 a transversely extending ridge structure 18 extends between the inner and outer sloping floors 14 and 15 and serves to divide the discharge area into four separate discharge openings. The ridge structure 18 includes an inverted V shaped upper section formed of oppositely sloping walls 19—19. The wall sections 19—19 lead to vertically disposed walls 20—20 which are disposed in spaced relation to provide a hollow chamber for the accommodation of door operating mechanisms as will be described.

The said vertical wall sections 17 and 20 constitute the end walls of the four hopper compartments heretofore referred to and in combination with the margins of the inner and outer sloping floors 14 and 15 define the boundaries of the discharge openings of said four hopper compartments.

The said vertical wall sections 20—20 of the ridge structure 18 extend beyond the side walls 15 as indicated at 21 to provide supporting walls for attachment of operating shaft bearings as will be pointed out. The wall sections 20—20 are united at their distal ends by longitudinally extending walls 22.

The lower margins of the wall sections 17 and 20 are reinforced by bar members 23 disposed on the outer sides thereof and the lower margins of sloping floors 14 and 15 are reinforced by angle shaped members indicated at 24 and 25 respectively.

The members 24 are preferably formed with a depending flange section 26 and the members 25 are preferably disposed with one flange 27 overlying the outer sloping floor 15. The said depending flange section 26 and overlying flange 27 respectively abut the respective end walls 17 and 20 and are united therewith by welding as indicated at 28. The bar members 23 extend to connect with the plates 17 and 20 in alignment with the flange sections 26 and 27 and thus combine to give the effect of four-sided frame-like structures bordering the discharge openings.

The discharge openings are adapted to be closed by pivotally mounted doors 29 which in general include a body plate 30 having upstanding flanges on three sides as seen at 31 and 32—32 and an upwardly sloping lip section 33 at the swinging end of the door. The doors in closed positions are adapted to enclose the four sided frame-like structure bordering the discharge opening. The doors are reinforced on the underside by a series of hinge beams 34 which meet with a longitudinally extending box-like beam member 35 adjacent to the swinging edge of the door.

The beam member 35 includes spaced webs 36 and 37 and a connecting wall 38 spaced from the body of the door. The edge of web 36 is welded to the door plate at 39 and the section forming web 37 is bent to present an angularly related flange portion 40 disposed to underlie the lip 33 of the door plate.

The doors are pivotally mounted at 41 on hinge brackets 42 which in turn are carried by the beam members 24. The brackets 42 are in the form of plate members disposed in spaced relation to accommodate hinge butts 43 therebetween which in turn are carried by the hinge beams 24. The hinge butts 43 are apertured at 44 for the reception of the pivots 41.

The swinging ends of the doors are adapted to be raised and lowered by operating mechanisms carried by rotatable shafts 45 journalled in bearing elements 46 disposed above the level of the doors and connected therewith by means of radial arm means 47 and linkage means 48. The shafts 45 are preferably of rectangular cross section and are fitted at each bearing with an annular sleeve 49 to provide circularly shaped journals.

The radial arm means 47 include a hub section 50 non-rotatably associated with the shaft 45 and a radially extending arm 51 apertured at its distal end to accommodate a pivot 52 for connection with the linkage means 48. The linkage means 48 preferably includes a pair of walls 53—53 spaced to lie on opposite sides of the arm 51 and at the lower portion a screwthreaded stem 54 is sandwiched between the walls 53—53 and welded thereto for the purposes of effecting lengthwise adjustable connections with the doors. The arm means 47 and associated linkage 48 are preferably located beyond the end of the door plates 30 and the door beams 35 are extended beyond said body plate portion 30 of the doors to dispose extensions in alignment with said mechanisms for the purpose of supporting swivelling seats 55 to connect with the screwthreaded stems 54. The swivelling seats 55 include an apertured body portion 56 through which the screwthreaded stem 54 is received and laterally extending trunnions 57 extend from the sides of the body portion. The trunnions 57—57 are received in bracket plates 58—58 which project forwardly from the beam members 35. The bracket plates 58 are contoured to fit in the angle presented by the angularly related wall sections 37 and 40 of the beam 35 and welded thereto as at 59 and 60. The screwthreaded stem 54 is adjustably maintained in relation to the swivelling seat portion 56 by means of complementary screw threaded nuts 61 and 62 respectively disposed on opposite sides of the seat.

The screwthreaded stem 54 which is sandwiched between the pair of walls 53—53 is preferably welded thereto as seen at 63 and 64.

The arm and linkage mechanism is adapted to jackknife to an overcenter toggle locked position as seen in FIGURE 6 along a line 65 to maintain the doors in closed position and to this end the walls 53—53 are indented at 66 to straddle the hub of the radial arm.

The doors on the opposite sides of the center sill are preferably conjointly operated from either side of the car and to this end the respective operating shafts 45 are operated through the medium of worm and gear assemblies rotatable in opposite directions. Inasmuch as the respective gear assemblies are of similar construction except for direction of rotation, the description will be confined to one of such assemblies. The gear assembly includes a gear wheel 67 non-rotatably mounted on shaft 45 and in meshing engagement with a worm wheel 68 which is formed with a rectangular shaped opening 69 for the reception of a complementary shaped shaft 70. The gear wheel 67 is formed with an annular hub 71 on each side thereof and a two part housing 72 is floatingly mounted on the hubs 71. The housing sections embrace roller thrust bearings 73 for the worm wheel 68.

The floatingly mounted housings are maintained against radial displacement in part by the shaft 70 and more specifically by an abutment stop in the form of an angle shaped member 74 extending between the spaced walls 20—20 of the transverse ridge and united therewith by welding as at 75. The shaft 70 is provided at each end with an operating head 76 having openings 77 for engagement by a removable bar (not shown) or operation by an extraneous power operated tool (not shown).

The operating heads 76 are guided between guiding vertical walls 78—78 of open sided bearings 79 carried by the tie plates 22 at the distal ends of the ridge structure 20.

The bearings 46 at the midway location are mounted on the outer side of the vertical wall extensions 21 and at the opposite end of the doors the shaft bearings 46 are carried on bearer plates 80 spaced from the vertical end wall sections 17 a sufficient distance to accommodate the mechanisms in the space so provided. The said bearer plates 80 are deflected at their upper end to present a bracing wall 81 for bracketing to the underside of end floors 16. The bearer plates are further braced to the side sill by gussets 82 and 83.

It will be noted that the bearings 46 at the midway location are disposed in close proximity to the worm and gear assemblies and therefore operate to relieve the said gear assemblies from imposing the weight of the doors and lading with a loaded car in transit.

Although one form of the invention has been shown and described by way of illustration, it will be understood that it may be constructed in various different embodiments which come within the appended claims.

What I claim is:

1. In a hopper car having a body structure defined in part by side and end walls and a longitudinally extending centrally disposed structure incorporating sloping floor walls spaced laterally from the side walls to present a discharge area on each side of the central structure, in combination;

(a) a transversely extending hollow housing presenting walls spaced longitudinally from each other and from the end walls to form therewith and with the laterally spaced central and side walls four adjoining hopper compartments, (b) said longitudinally and transversely extending walls having their marginal edges defining the boundaries of openings for discharge of lading, (c) longitudinally extending doors for each hopper opening hingedly mounted along the lower margin of each side of the centrally disposed structure and swingable to closed position in meeting relation with the side floors, (d) means for raising and lowering the swinging ends of the doors including,
 (1) a rotatable shaft for each door journalled above the level thereof,
 (2) radially extending arm means fast on the shaft,
 (3) linkage means pivotally connecting the arm means and doors,
 (4) said arm and linkage means being adapted to fold in toggle locked relation for maintaining the doors in closed position, (e) means for conjointly operating the doors on the opposite sides of the central structure including,
 (1) oppositely rotatable worm and gear assemblies each carried by one of said rotatable door shafts,
 (2) housings enclosing the worms and gears,
 (3) a transversely extending shaft non-rotatably carrying the oppositely rotatable worm gears for operating the mechanism shafts in opposite directions by rotation of said transverse shaft,
 (4) said housings and the transversely extending shaft being supported solely on the mechanism shafts, whereby they are in floating relation to the structure of the hopper car,
 (5) and abutment means engageable with the housings for preventing radial displacement of the worm and gear assemblies in a shaft unwinding direction.

2. The invention set forth in claim 1 wherein:
(a) a door beam extends longitudinally along the swinging edge of the door and
(b) said beam includes angularly related walls with one wall underlying the door edge and an adjacent wall outstanding therefrom,
(c) bracket plates longitudinally spaced from each other disposed in the angle presented by the angularly related walls and projecting beyond the door edge,
(d) an apertured swivelling seat disposed between the spaced bracket plates and pivotally carried by the bracket plates,
(e) a stem forming an integral extension of the linkage and having a screwthreaded end extending through the seat, and
(f) complementary screwthreaded nuts embracing the screwthreaded stem on opposites sides of the seat.

3. The invention set forth in claim 1 wherein:
(a) the radial arm and linkage means are disposed outwardly of the hopper compartment end walls and
(b) the door beam is extended beyond the ends of the door edge to dispose the bracket plates and associated swivelling seat in alignment with the arm and linkage means.

4. In a hopper car having a bottom opening for discharge of lading and a hinged door plate for closing the opening in combination:
(a) a beam having a portion of angular shape attached to the edge of the door plate distal from the hinged edge,
(b) said angular portion of the beam having one of its walls underlying the door plate and the adjacent wall outstanding from the door plate,
(c) longitudinally spaced bracket plates positioned in edgewise relation in the angle formed by the angularly related walls and projecting beyond the door plate,
(d) an apertured swivelling seat disposed between the spaced bracket plates and pivotally supported thereby,
(e) a shaft rotatably mounted to extend along the door above the level thereof, shaft,
(f) radial arm means non-rotatably carried by the shaft,
(g) linkage means pivotally connected at one end with the arm means,
(h) the opposite end of said linkage means including an integral screwthreaded stem extending through the aperture in the swivelling seat, and
(i) complementary screwthreaded nuts embracing the stem on opposite sides of the seat and in close contact with said seat for rigidly connecting said stem to said swivelling seat.

References Cited

UNITED STATES PATENTS

| 789,392 | 5/1905 | Summers | 105—307 X |
|---|---|---|---|
| 1,368,720 | 2/1921 | Hart | 105—255 |
| 2,835,208 | 5/1958 | Faverty | 105—307 X |
| 3,137,247 | 6/1964 | Hamilton et al. | 105—255 X |
| 3,255,713 | 6/1966 | Lindstrom | 105—307 X |

ARTHUR LA POINT, *Primary Examiner.*

HOWARD BELTRAN, *Assistant Examiner.*

U.S. Cl. X.R.

105—255, 307